United States Patent
Tsirkin (10) Patent No.: US 9,483,297 B2
(45) Date of Patent: Nov. 1, 2016

(54) INTELLIGENT DETECTION OF INCONSISTENT ADVANCED CONFIGURATION AND POWER INTERFACE (ACPI) TABLE INSTANCES IN VIRTUALIZED SYSTEMS

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/288,673

(22) Filed: May 28, 2014

(65) Prior Publication Data

US 2015/0347171 A1 Dec. 3, 2015

(51) Int. Cl.
G06F 9/455 (2006.01)
G06F 9/45 (2006.01)

(52) U.S. Cl.
CPC ............ *G06F 9/45558* (2013.01); *G06F 8/53* (2013.01)

(58) Field of Classification Search
None
See application file for complete search history.

(56) References Cited

U.S. PATENT DOCUMENTS

| 7,051,322 B2 | 5/2006 | Rioux |
| 7,296,261 B2 | 11/2007 | Witchel et al. |
| 7,844,845 B2 | 11/2010 | Chen et al. |
| 8,429,628 B2 | 4/2013 | Spurlin |
| 2008/0168426 A1* | 7/2008 | Mitran ............... G06F 11/3688 717/126 |
| 2009/0144570 A1* | 6/2009 | Chen ..................... G06F 1/3203 713/320 |

OTHER PUBLICATIONS

Chipounov, V. et al., "Reverse Engineering of Binary Device Drivers with RevNIC", EuroSys '10, Apr. 13-16, 2010, 14 pages, Paris, France, downloaded from http://dslab.epfl.ch/pubs/revnic.pdf on May 28, 2014.

Chen, G. et al., "A Novel Lightweight Virtual Machine Based Decompiler to Generate C/C++ Code with High Readability", School of Software, Shanghai Jiao Tong University, Shanghai, China, 11 pages, downloaded from http:/1202.120.40.100/wiki/images/c/c5/Decompiler.pdf on May 28, 2014.

Yang, Y. et al., "An efficient adapting virtual intermediate instruction set towards optimized dynamic binary translator (DBT) system", Journal of Central South University, Feb. 1, 2012, pp. 3118-3128, downloaded from http://www.zndxzk.com.cn/down/upfile/soft/20121029/16-P3118-E112523.pdf on May 28, 2014.

(Continued)

*Primary Examiner* — Adam Lee
(74) *Attorney, Agent, or Firm* — Lowenstein Sandler LLP (57) ABSTRACT

A system and methods are disclosed for detecting inconsistent instances of a system table in a virtualized computer system. In accordance with one embodiment, a processing device decompiles a first binary representing a first instance of a system table, to obtain a first string of symbols. The processing device also decompiles a second binary representing a second instance of the system table that is associated with guest firmware of a first virtual machine, to obtain a second string of symbols. When there is a difference between the first string of symbols and the second string of symbols and the difference is unrelated to a compiler version and a temporary variable name, a signal indicating an inconsistency between the first instance and the second instance is generated.

17 Claims, 4 Drawing Sheets

(56) References Cited

OTHER PUBLICATIONS

Yan, Q. et al., "Conservative Signed/Unsigned Type Inference for Binaries Using Minimum Cut", Technical Report: Signed/Unsigned Type Inference for Binaries, Jan. 17, 2014, 8 pages, downloaded from http://www-users.cs.umn.edu/~mccamant/pubs/tr/signedness-jan2014.pdf on May 28, 2014.

Lawson, N., "Manual Reference Pages—IASL (8)", FreeBSD Man Pages, Aug. 7, 2003, 3 pages, downloaded from http://gsp.com/cgi-bin/man.cgi?section=8&topic=iasl, retrieved May 28, 2014 on May 28, 2014.

* cited by examiner

INTELLIGENT DETECTION OF INCONSISTENT ADVANCED CONFIGURATION AND POWER INTERFACE (ACPI) TABLE INSTANCES IN VIRTUALIZED SYSTEMS

TECHNICAL FIELD

This disclosure relates to computer systems, and more particularly, to virtualized computer systems.

BACKGROUND

An operating system (OS) is a set of programs that manage computer hardware resources and provide common services for application software. For hardware functions such as input and output and memory allocation, the operating system typically acts as an intermediary between application programs and hardware. Operating systems may be found on a variety of devices, including desktop computers, servers, smartphones, video game consoles, and so forth.

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

The Advanced Configuration and Power Interface (ACPI) specification provides an open standard for device configuration and power management by the operating system. The ACPI specification defines four global "Gx" states G0 through G3, six sleep "Sx" states S0 through S5, four device states D0 through D3, four processor states C0 through C3, and up to 17 implementation-dependent power-performance states P0 through Pn, where n is an integer between 1 and 16 inclusive. In addition, ACPI defines several tables that provide an interface between an ACPI-compliant operating system and system firmware, including a Differentiated System Description Table (DSDT), a Secondary System Description Table (SSDT), and a System Resource Affinity Table (SRAT).

Each ACPI table may be represented by a string of symbols. A compiler may be used to process the string of symbols and generate a binary associated with the ACPI table.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for detecting inconsistent instances of an Advanced Configuration and Power Interface (ACPI) table in a virtualized computer system. In accordance with one embodiment, a first binary representing a first instance of an ACPI table is decompiled to obtain a first string of symbols. A second binary representing a second instance of the ACPI table that is associated with guest firmware of a virtual machine is decompiled to obtain a second string of symbols. When there is a difference between the first string of symbols and the second string of symbols, a signal indicating an inconsistency between the first instance and the second instance is generated if the difference is unrelated to a compiler version (e.g., the difference is not due to different compiler versions being used to generate the first binary and the second binary, etc.) and is unrelated to a temporary variable name (e.g., the difference is not due to different temporary variable names being generated in the first binary and the second binary, etc.).

Embodiments of the present disclosure thus enable virtualized systems to detect substantive inconsistencies between instances of an ACPI table (e.g., inconsistent device properties, inconsistent checksums, etc.) without sounding "false alarms" for non-substantive differences related to the use of different versions of a compiler to generate the two ACPI table binaries, or related to the generation of different temporary variable names in the two ACPI table binaries.

While the present disclosure is described with respect to detecting substantive inconsistencies between ACPI table instances, embodiments of the present disclosure may also be employed for detecting substantive inconsistencies between instances of other types of operating system tables, as well as for detecting substantive inconsistencies between instances of any type of binary (e.g., executable code, etc.). Moreover, while the present disclosure is described in the context of virtualized systems, techniques of the present disclosure can also be adapted for use in computer systems that do not employ virtualization.

Figure 1:
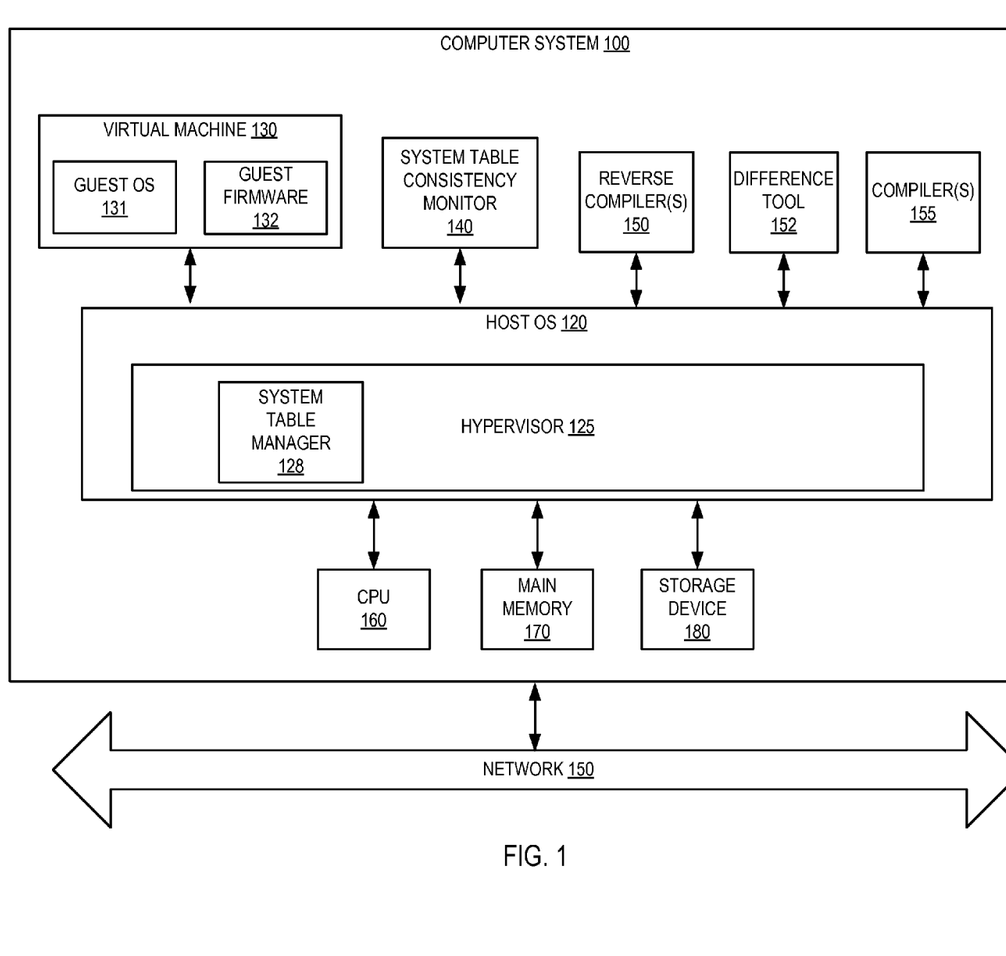
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. Virtual machine 130 is a software implementation of a machine that executes programs as though it were an actual physical machine. As shown in FIG. 1, virtual machine 130 includes a guest operating system (OS) 131 that manages the execution of these programs, and guest firmware 132. In one embodiment, virtual machine 130 also includes a guest basic input/output system (BIOS) (not depicted in the Figure) that serves as an interface to guest firmware 132. It should be noted that although, for simplicity, a single virtual machine is depicted in FIG. 1, in some other embodiments computer system 100 may host a plurality of virtual machines.

In accordance with one example, hypervisor 125 may include a system table manager 128 that is capable of obtaining binaries (e.g., binaries representing instances of an ACPI table, etc.) from guest operating systems (e.g., guest OS 131 of VM 130). It should be noted that in some other examples, hypervisor 125 may be external to host OS 120, rather than embedded within host OS 120.

As shown in FIG. 1, computer system 100 also comprises a system table consistency monitor 140, a set of one or more reverse compilers 150, a difference tool 152, and a set of one or more compilers 155. System table consistency monitor 140 is capable of determining whether or not a first instance of a system table (e.g., an ACPI table, etc.) and a second instance of the system table associated with guest firmware (e.g., guest firmware 132, etc.) are consistent, as described in detail below with respect to FIGS. 2 and 3. Reverse compiler(s) 150 is a set of one or more reverse compilers, each of which is capable of decompiling a binary (e.g., a binary representing an ACPI table, a binary representing executable code, etc.) to obtain a corresponding string of symbols (e.g., a symbolic representation of the ACPI table, source code corresponding to the executable code, etc.). Difference tool 152 is capable of determining differences (or deltas) between two strings of symbols (e.g., the contents of two document files, the contents of two source code files, etc.). Compiler(s) 155 is a set of one or more compilers, each of which is capable of generating a binary from a string of symbols (e.g., generating a binary representation of an ACPI table from a symbolic representation of the ACPI table, generating executable code from source code, etc.). Some operations of system table consistency monitor 140, reverse compiler(s) 150, difference tool 152, and compiler(s) 155 are described in detail below with respect to FIGS. 2 and 3.

Figure 2:
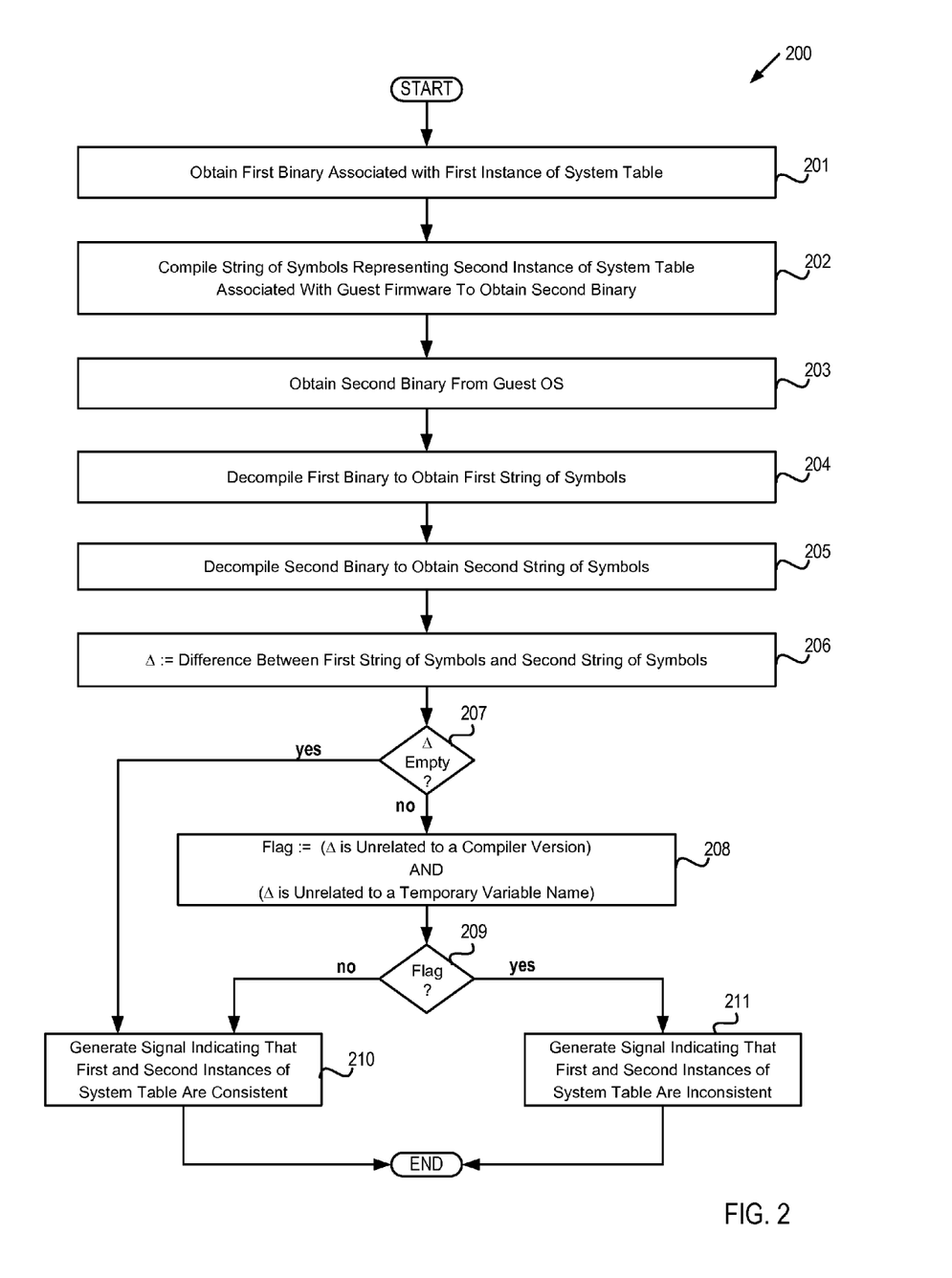
FIG. 2 depicts a flow diagram of one embodiment of a first method for detecting inconsistent instances of an ACPI table.

FIG. 2 depicts a flow diagram of one embodiment of a first method 200 for detecting inconsistent instances of an ACPI table. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted.

At block 201, a first binary associated with a first instance of a system table (e.g., an ACPI table, etc.) is obtained. In one embodiment, the first binary is obtained by system table consistency monitor 140, and in some examples system table consistency monitor 140 obtains the first binary from a guest operating system of a virtual machine (e.g., guest OS 131 of virtual machine 130, etc.). In one embodiment, the first binary is generated by one of compiler(s) 155, which processes a string of symbols encoding contents of the first instance of the system table.

At block 202, a string of symbols representing a second instance of the system table is compiled to obtain a second binary. In one embodiment, the second instance of the system table is associated with guest firmware (e.g., guest firmware 132 of virtual machine 130, etc.), and one of compiler(s) 155 is invoked by guest OS 131 of VM 130 to process a string of symbols encoding contents of the second table instance and generate the second binary. In one example, the compiler that generates the second binary is a different version of the compiler that generated the first binary.

In some examples where the first binary is obtained from a guest OS at block 201 and the second instance of the system table is associated with guest firmware, the guest OS and the guest firmware may be hosted by different virtual machines. For example, the first binary may be obtained from guest OS 131 of VM 130, while the second instance of the system table may be associated with guest firmware of a virtual machine other than VM 130 (not depicted in FIG. 1). Alternatively, the second instance of the system table may be associated with guest firmware 132 of VM 130, while the first binary may be obtained from a guest OS of a virtual machine other than VM 130 (not depicted in FIG. 1).

At block 203, the second binary is obtained from guest OS 131. In one embodiment, system table manager 128 of hypervisor 125 obtains the second binary from guest OS 131.

At block 204, the first binary is decompiled to obtain a first string of symbols, and at block 205, the second binary is decompiled to obtain a second string of symbols. In one example, system table consistency monitor 140 invokes one of reverse compiler(s) 150 to decompile the first binary and second binary at blocks 204 and 205. In some such examples, reverse compiler(s) 150 may consist of a single reverse compiler, while in some other such examples, reverse compiler(s) 150 may comprise a plurality of reverse compilers, in which case system table consistency monitor 140 uses the same one of reverse compiler(s) 150 to decompile the first binary and second binary. It should be noted that in the case where there are a plurality of reverse compilers, system table consistency monitor 140 may select a particular one of the reverse compilers based on any of a variety of criteria (e.g., a reverse compiler with a highest priority, a reverse compiler with a highest quality rating, etc.).

At block 206, difference Δ between the first string of symbols and the second string of symbols is generated. In one embodiment, system table consistency monitor 140 invokes difference tool 152 to compute Δ. It should be noted that in some embodiments, difference tool 152 may be provided in the distribution of host OS 120 (e.g., the diff tool typically included in UNIX and Linux distributions, etc.).

Block 207 branches based on whether difference Δ computed at block 206 is empty. If Δ is empty, then execution continues at block 210; otherwise, execution proceeds to block 208.

At block 208, a flag is set to true if (e.g., only if):
difference Δ is unrelated to a compiler version (e.g., difference Δ is not due to different compiler versions being used to generate the first binary and the second binary, etc.); and
difference Δ is unrelated to a temporary variable name (e.g., difference Δ is not due to different temporary variable names being generated in the first binary and the second binary, etc.).

Block 209 branches based on the value of the flag set at block 208. If the flag is false, then execution continues at block 210; otherwise, execution continues at block 211.

At block 210, a signal is generated indicating that the first and second instances of the system table are consistent. At block 211, a signal is generated indicating that the first and second instances of the system table are inconsistent.

Figure 3:
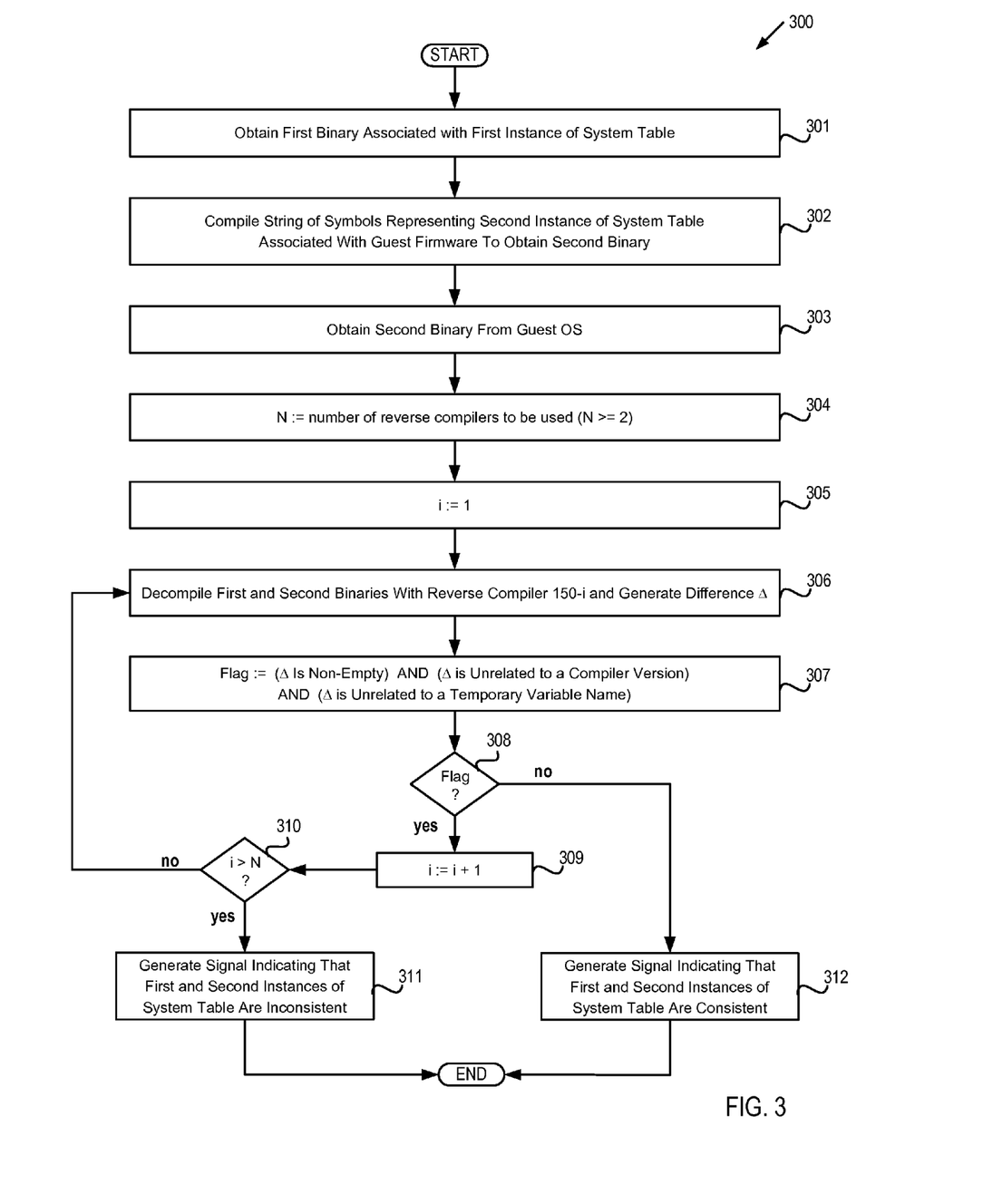
FIG. 3 depicts a flow diagram of one embodiment of a second method for detecting inconsistent instances of an ACPI table.

FIG. 3 depicts a flow diagram of one embodiment of a second method 300 for detecting inconsistent instances of an ACPI table. In this second method, reverse compiler(s) 150 comprises a plurality of reverse compilers. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted.

At block 301, a first binary associated with a first instance of a system table (e.g., an ACPI table, etc.) is obtained. In one embodiment, the first binary is obtained by system table consistency monitor 140, and in some examples system table consistency monitor 140 obtains the first binary from a guest operating system of a virtual machine (e.g., guest OS 131 of virtual machine 130, etc.). In one embodiment, the first binary is generated by one of compiler(s) 155, which processes a string of symbols encoding contents of the first instance of the system table.

At block 302, a string of symbols representing a second instance of the system table is compiled to obtain a second binary. In one embodiment, the second instance of the system table is associated with guest firmware (e.g., guest firmware 132 of virtual machine 130, etc.), and one of compiler(s) 155 is invoked by guest OS 131 of VM 130 to process a string of symbols encoding contents of the second table instance and generate the second binary. In one example, the compiler that generates the second binary is a different version of the compiler that generated the first binary.

In some examples where the first binary is obtained from a guest OS at block 301 and the second instance of the system table is associated with guest firmware, the guest OS and the guest firmware may be hosted by different virtual machines. For example, the first binary may be obtained from guest OS 131 of VM 130, while the second instance of the system table may be associated with guest firmware of a virtual machine other than VM 130 (not depicted in FIG. 1). Alternatively, the second instance of the system table may be associated with guest firmware 132 of VM 130, while the first binary may be obtained from a guest OS of a virtual machine other than VM 130 (not depicted in FIG. 1).

At block 303, the second binary is obtained from guest OS 131. In one embodiment, system table manager 128 of hypervisor 125 obtains the second binary from guest OS 131.

At block 304, variable N is set to the number of reverse compilers to be used to determine whether or not the first and second instances of the system table are consistent. In one example, N is an integer greater than or equal to 2.

It should be noted that in some examples, all of the reverse compilers 150 present in computer system 100 may be used, while in some other examples where there are at least 3 reverse compilers 150 present in computer system 100, some but not all of reverse compilers 150 may be used. The N reverse compilers used are referred to subsequently as reverse compilers 150-1 through 150-N.

At block 305, variable i is initialized to 1. At block 306, the first and second binaries are decompiled using reverse compiler 150-i to obtain a first string of symbols and a second string of symbols, and difference Δ between the strings is generated. In one embodiment, system table consistency monitor 140 invokes difference tool 152 to compute Δ.

At block 307, a flag is set to true if and only if:
difference Δ is non-empty;
difference Δ is unrelated to a compiler version (e.g., difference Δ is not due to different compiler versions being used to generate the first binary and the second binary, etc.); and
difference Δ is unrelated to a temporary variable name (e.g., difference Δ is not due to different temporary variable names being generated in the first binary and the second binary, etc.).

Block 308 branches based on the value of the flag set at block 307. If the flag is true, then execution proceeds to block 309; otherwise, execution continues at block 312.

At block 309, variable i is incremented by 1. Block 310 branches based on a comparison of variables i and N; if i>N, execution proceeds to block 311, otherwise execution continues back at block 306.

At block 311, a signal is generated indicating that the first and second instances of the system table are inconsistent. At block 312, a signal is generated indicating that the first and second instances of the system table are consistent.

Figure 4:
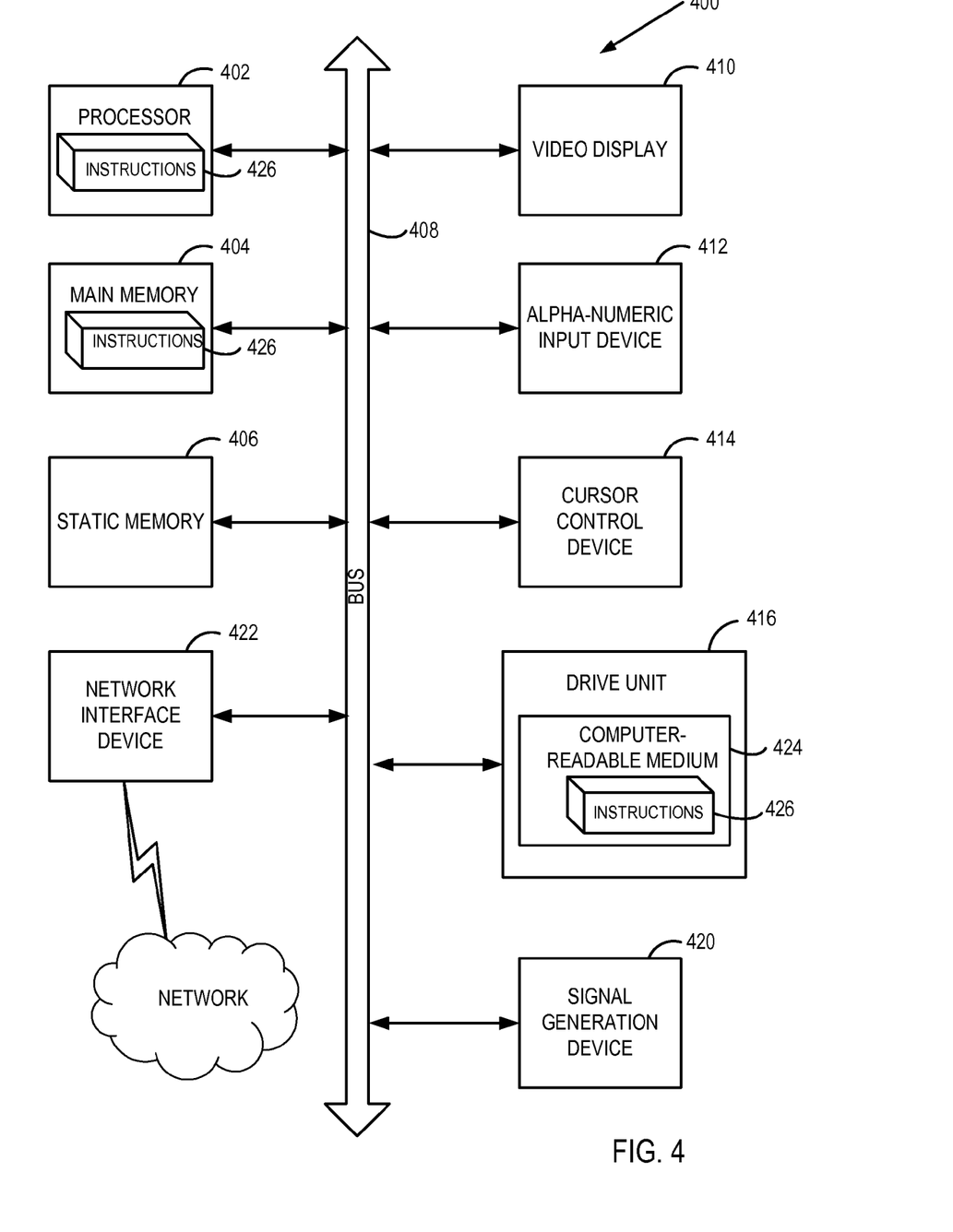
FIG. 4 depicts a block diagram of an illustrative computer system operating in accordance with embodiments of the disclosure.

FIG. 4 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "generating", "obtaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
decompiling, by a processing device, a first binary representing a first instance of a system table that is associated with a guest operating system of a first virtual machine, to obtain a first string of symbols comprising a first temporary variable name, wherein the first binary is generated by a first version of a compiler;
decompiling, by the processing device, a second binary representing a second instance of the system table that is associated with guest firmware of a second virtual machine, to obtain a second string of symbols comprising a second temporary variable name that is different than the first temporary variable name, wherein the second binary is generated by a second version of the compiler that is different than the first version of the compiler; and
in response to determining that there is a difference between the first string of symbols and the second string of symbols, and that the difference is not due to different compiler versions and is not due to different temporary variable names, generating a signal indicating an inconsistency between the first instance and the second instance.

2. The method of claim 1 wherein the system table is an Advanced Configuration and Power Interface (ACPI) table.

3. The method of claim 1 wherein the first binary is generated by a compiler that processes a third string of symbols encoding contents of the first instance of the system table.

4. The method of claim 1 wherein the second binary is generated by a compiler that processes a fourth string of symbols encoding contents of the second instance of the system table.

5. The method of claim 1 further comprising running a reverse compiler to decompile at least one of the first binary or the second binary.

6. The method of claim 1 further comprising invoking a tool to generate the difference between the first string of symbols and the second string of symbols.

7. The method of claim 1 further comprising notifying a user that the first instance of the system table and the second instance of the system table are inconsistent.

8. An apparatus comprising:
a memory to store a first instance of a system table that is associated with a guest operating system of a first virtual machine, and a second instance of the system table that is associated with guest firmware of a second virtual machine; and
a processing device, operatively coupled to the memory, to:
decompile a first binary representing the first instance of the system table to obtain a first string of symbols comprising a first temporary variable name, wherein the first binary is generated by a first version of a compiler,
decompile a second binary representing the second instance of the system table to obtain a second string of symbols comprising a second temporary variable name that is different than the first temporary variable name, wherein the second binary is generated by a second version of the compiler that is different than the first version of the compiler, and
in response to a determination that there is a difference between the first string of symbols and the second string of symbols, and that the difference is not due to different compiler versions and is not due to different temporary variable names, generate a signal indicating an inconsistency between the first instance and the second instance.

9. The apparatus of claim 8 wherein the system table is an Advanced Configuration and Power Interface (ACPI) table.

10. The apparatus of claim 8 wherein the first binary is generated by a compiler that processes a third string of symbols encoding contents of the first instance of the system table.

11. The apparatus of claim 8 wherein the second binary is generated by a compiler that processes a fourth string of symbols encoding contents of the second instance of the system table.

12. The apparatus of claim 8 wherein the processing device is further to generate the difference between the first string of symbols and the second string of symbols.

13. The apparatus of claim 8 wherein the processing device is further to notify a user that the first instance of the system table and the second instance of the system table are inconsistent.

14. A non-transitory computer readable storage medium, having instructions stored therein, which when executed, cause a processing device to:
decompile, by the processing device, a first binary representing a first instance of a system table that is associated with a guest operating system of a first virtual machine, to obtain a first string of symbols comprising a first temporary variable name, wherein the first binary is generated by a first version of a compiler;
decompile, by the processing device, a second binary representing a second instance of the system table that is associated with guest firmware of a second virtual machine, to obtain a second string of symbols comprising a second temporary variable name that is different than the first temporary variable name, wherein the second binary is generated by a second version of the compiler that is different than the first version of the compiler; and
in response to a determination that there is a difference between the first string of symbols and the second string of symbols, and that the difference is unrelated to a compiler version, and that the difference is not due to different compiler versions and is not due to different temporary variable names, generate a signal indicating an inconsistency between the first instance and the second instance.

15. The non-transitory computer readable storage medium of claim 14 wherein the first binary is generated by a compiler that processes a third string of symbols encoding contents of the first instance of the system table.

16. The non-transitory computer readable storage medium of claim 14 wherein the second binary is generated by a compiler that processes a fourth string of symbols encoding contents of the second instance of the system table.

17. The non-transitory computer readable storage medium of claim 14 wherein the instructions further cause the processing device to notify a user that the first instance of the system table and the second instance of the system table are inconsistent.

* * * * *